United States Patent
Chalubert et al.

(10) Patent No.: US 10,048,810 B2
(45) Date of Patent: Aug. 14, 2018

(54) SYSTEM AND METHOD FOR DETECTING THE ACTUATION OF A FUNCTION IN THE FORM OF A PRE-DETERMINED PATH ON A TOUCH-SENSITIVE SURFACE OF AN OBJECT

(71) Applicants: COMMISSARIAT À L'ÉNERGIE ATOMIQUE ET AUX ÉNERGIES ALTERNATIVES, Paris (FR); RENAULT s.a.s., Boulogne Billancourt (FR)

(72) Inventors: Gerard Chalubert, Voisins le Bretonneux (FR); Jean-Pierre Nikolovski, Carry-le-Rouet (FR); Nicolas Guenard, Gif-sur-Yvette (FR); Olivier Brelaud, Saulx-Marchais (FR); Jean-Philippe Alexander, La Riche (FR)

(73) Assignees: Commissariat à l'énergie atomique et aux énergies alternatives, Paris (FR); RENAULT s.a.s., Boulogne Billancourt (FR)

( * ) Notice: Subject to any disclaimer, the term of this patent is extended or adjusted under 35 U.S.C. 154(b) by 564 days.

(21) Appl. No.: 14/428,549

(22) PCT Filed: Sep. 12, 2013

(86) PCT No.: PCT/FR2013/052094
§ 371 (c)(1),
(2) Date: Mar. 16, 2015

(87) PCT Pub. No.: WO2014/041305
PCT Pub. Date: Mar. 20, 2014

(65) Prior Publication Data
US 2015/0248176 A1   Sep. 3, 2015

(30) Foreign Application Priority Data

Sep. 14, 2012   (FR) .................................. 12 58676

(51) Int. Cl.
*G06F 3/043*    (2006.01)
*G06F 3/041*    (2006.01)
(Continued)

(52) U.S. Cl.
CPC ............ *G06F 3/043* (2013.01); *G06F 3/0416* (2013.01); *G06F 3/0436* (2013.01); *G06K 9/52* (2013.01);
(Continued)

(58) Field of Classification Search
CPC ...... G06F 3/043; G06F 3/0433; G06F 3/0436; G06F 3/0416; G06F 2203/04104; G06K 9/6215; G06K 9/52
See application file for complete search history.

(56) References Cited

U.S. PATENT DOCUMENTS 6,741,237 B1    5/2004   Benard et al.
2004/0164970 A1  8/2004   Benard et al.
(Continued)

FOREIGN PATENT DOCUMENTS

FR   2 916 545    11/2008
FR   2 948 471    1/2011

OTHER PUBLICATIONS

French Search Report dated May 16, 2013 in French Application No. 1258676 Filed Sep. 14, 2012.
(Continued)

*Primary Examiner* — William Boddie
*Assistant Examiner* — Saifeldin Elnafia
(74) *Attorney, Agent, or Firm* — Oblon, McClelland, Maier & Neustadt, L.L.P.

(57) ABSTRACT

A system detecting actuation of a pre-determined function, the actuation executed by touch contact with a pre-determined path associated with the function on a touch-sensitive surface of an object, including: at least two separate sources for transmitting bulk acoustic waves in the touch-sensitive surface, configured to generate acoustic interference between the transmitted waves; at least one bulk acoustic wave receiver after propagation and interference thereof in the touch-sensitive surface, configured to supply a reception signal based on the acoustic waves received; a mechanism storing plural reference spectral signatures associated with the pre-determined path, each of the spectral signatures associated with a localization of a touch on the pre-determined path; and a mechanism detecting actuation of the pre-determined function by comparing at least one spectral signature of the reception signal to a spectral envelope, or reference spectral envelope, of the plural reference spectral signatures associated with the pre-determined path.

8 Claims, 4 Drawing Sheets

(51) Int. Cl.
  *G06K 9/52* (2006.01)
  *G06K 9/62* (2006.01)

(52) U.S. Cl.
  CPC .......... *G06K 9/6215* (2013.01); *G06F 3/0433* (2013.01); *G06F 2203/04104* (2013.01)

(56) References Cited

U.S. PATENT DOCUMENTS

| | | | |
|---|---|---|---|
| 2005/0174338 A1* | 8/2005 | Ing ........................ | G06F 3/0433 345/177 |
| 2006/0109261 A1* | 5/2006 | Chou .................... | G06F 3/0436 345/177 |
| 2010/0283745 A1 | 11/2010 | Nikolovski et al. | |
| 2011/0137968 A1* | 6/2011 | Ing ......................... | G06F 3/043 708/201 |
| 2012/0120014 A1 | 5/2012 | Nikolovski et al. | |

OTHER PUBLICATIONS

International Search Report dated Dec. 20, 2013 in PCT/FR13/052094 Filed Sep. 12, 2013.

* cited by examiner

SYSTEM AND METHOD FOR DETECTING THE ACTUATION OF A FUNCTION IN THE FORM OF A PRE-DETERMINED PATH ON A TOUCH-SENSITIVE SURFACE OF AN OBJECT

The present invention relates to a system for detecting the actuation of a function in the form of a pre-determined path on a touch-sensitive surface of an object. It also relates to a method used by this system.

The prior art includes various systems for detecting and localizing touches on a touch-sensitive surface, comprising means for transmitting bulk acoustic waves in the touch-sensitive surface, means for receiving bulk acoustic waves after the propagation thereof in the touch-sensitive surface, designed to supply a reception signal on the basis of the acoustic waves received, and means for detecting and localizing touch on the touch-sensitive surface on the basis of the reception signal. Detecting the actuation of a function in the form of a pre-determined path on this touch-sensitive surface then consists of detecting and localizing a plurality of successive touches along this path.

The patent published under the number U.S. Pat. No. 6,741,237 describes a system using the disruption of a transit time of seismic acoustic waves propagated in an object, for example a touch-sensitive screen, between a transmitting transducer and at least two receiving transducers arranged about the object such that this disruption induces different fluctuations in the transit times from the disruption zone to the two receiving transducers. This system is only based on differences in transit times and requires the arrangement of the transducers in precise locations about the object in order to maximize the transit time differentials along at least two separate directions, for example in the corners for a rectangular touch-sensitive screen panel. Furthermore, it makes it possible to detect an isolated touch type disruption, but not to characterize it further.

To enhance the sensitivity of the system, proposing solutions based on spectral reception signal analysis is known. The invention thus applies more specifically to a system for detecting the actuation of a pre-determined function, this actuation being executed by means of touch contact with a pre-determined path associated with this function on a touch-sensitive surface of an object, comprising:
  at least two separate sources for transmitting bulk acoustic waves in the touch-sensitive surface, arranged so as to generate acoustic interference between the transmitted waves,
  at least one bulk acoustic wave receiver after the propagation and interference thereof in the touch-sensitive surface, designed to supply a reception signal on the basis of the acoustic waves received, and
  means for storing a plurality of reference spectral signatures associated with the pre-determined path, each of these spectral signatures being associated with a localization of a touch on the pre-determined path.

By way of example, the patent published under the number FR 2 916 545 describes a system using absorption signature recognition relating to a seismic acoustic wave on a set of resonance figures of the touch-sensitive interface. The relative damping and phase-shift for each frequency induced by touch represent one of the frequency components of a relative damping vector constructed on a predefined number of resonance figures. Using this system, it is possible to accurately detect and localize an interaction on any surface using a reduced number of transducers, according to a rate of measurements of up to fifty localizations per second. The interaction is localized by comparing the absorption signature detected to reference signatures each corresponding to the localization of a touch somewhere on the touch-sensitive surface. The reference signatures are obtained by means of a learning process.

Detecting the actuation of a function in the form of a path thus requires the detection and localization of a plurality of successive touches along this path, implying a plurality of successive comparisons of absorption signatures detected with at least the set of reference signatures each corresponding to one point of the path. When the rate of measurement is limited by the electronics, it is highly likely that all the points of the path covered are not detected if the speed of touch contact with the path, for example using a finger, is high. The tolerable speed for performing the operation is thus limited by the performance of the acquisition electronics. Furthermore, to compensate for limitations in the acquisition electronics, it is necessary to increase the spatial sampling of the path, i.e. increase the number of reference signatures learned for this path. This technique then involves a relatively high memory usage, as the greater the number of learned points forming the path, the better the detection of the touch contact thereof, but given that the size of a reference signature is approximately 1024×16 bits, significant memory will be required to define a path (approximately 20 kilobytes).

An enhancement of this system is proposed in the French patent application published under the number FR 2 948 471 wherein resonance figures are no longer used but transient radiation figures, generally referred to as "pulse diffraction figures". As such, the localization method used is not dependent on the natural frequencies of the object and is further capable of detecting multiple touches. However, here again, the same problems arise for the same reasons when detecting dynamic contact with a pre-determined path on the touch-sensitive surface.

It may thus be sought to envisage a system for detecting the actuation of a function in the form of a pre-determined path on a touch-sensitive surface of an object which makes it possible to do away with at least some of the problems and constraints mentioned above, which is particularly more suitable for detecting dynamic touch contact with the path.

It is thus proposed a system for detecting the actuation of a pre-determined function, this actuation being executed by means of touch contact with a pre-determined path associated with this function on a touch-sensitive surface of an object, comprising:
  at least two separate sources for transmitting bulk acoustic waves in the touch-sensitive surface, arranged so as to generate acoustic interference between the transmitted waves,
  at least one bulk acoustic wave receiver after the propagation and interference thereof in the touch-sensitive surface, designed to supply a reception signal on the basis of the acoustic waves received,
  means for storing a plurality of reference spectral signatures associated with the pre-determined path, each of these spectral signatures being associated with a localization of a touch on the pre-determined path, and
  means for detecting the actuation of the pre-determined function by comparing at least one spectral signature of the reception signal to a spectral envelope, or reference spectral envelope, of the plurality of reference spectral signatures associated with the pre-determined path.

While retaining an advantageous technology disclosed in the patent documents FR 2 916 545 and FR 2 948 471, it is thus possible to optimize the application thereof to the dynamic detection of path contact (associated with a function) by modeling this path not with a set of individualized reference signatures, but with a spectral envelope of these signatures. Consequently, even when multiplying the spatial resolution of the reference signatures learned, the complexity of detection is not increased. A spectral envelope of a plurality of spectral signatures corresponds, in terms of data processing, to two reference signatures, one being the upper part of the envelope and the other the lower part thereof. Furthermore, it was surprisingly observed, in terms of performance and accuracy, the spectral envelope thus modeling a pre-determined path identifies this path as well as the set of spectral signatures of the points forming same. In fact, the spectral signatures of the points of the same path differ from each other, but according to variations that are finally sufficiently homogeneous for the envelope of these spectral signatures to remain characteristic of this path.

Optionally, the means for detecting the actuation of the pre-determined function comprise:
  means for computing a spectral envelope of a plurality of successive spectral signatures of the reception signal,
  means for comparing this computed spectral envelope to the reference spectral envelope.

Also optionally, the comparison means are configured to perform a similarity test between the computed spectral envelope and the reference spectral envelope based on the following computation:

$$Cr = \begin{cases} \sum_{f \in F} sat(E^+ - Eref^+) + \sum_{f \in F} sat(E^- - Eref^-) + \\ \sum_{f \in F} sat(Eref^+ - E^+) + \sum_{f \in F} sat(Eref^- - E^-) \end{cases},$$

where F denotes the band of frequencies f wherein the envelopes are defined, $E^+$ and $E^-$ the upper and lower parts of the computed spectral envelope, $Eref^+$ and $Eref^-$ the upper and lower parts of the reference spectral envelope, and sat( ) the function defined as follows:

$$\begin{cases} sat(x) = 0 & \text{if } x < 0 \\ sat(x) = x & \text{else} \end{cases}.$$

Also optionally, each spectral signature, reference and reception signal, is defined on the basis of the spectrum, of the corresponding reference signal and reception signal, computed in a pre-determined frequency band, the reference spectral envelope being computed in the same pre-determined frequency band.

Also optionally, the reference spectral envelope is computed only at frequencies of the pre-determined frequency band for which the amplitudes of the spectral signatures associated with the pre-determined path are greater than a minimum threshold, particularly a threshold set at 1% of the maximum peak of these signatures.

Also optionally, the pre-determined path is in the form on the touch-sensitive surface of a ridge line formed using a tab molded in the material of the touch-sensitive surface.

Also optionally, the tab is formed by a local deformation of reduced thickness of the touch-sensitive surface or of a thickness thinning toward the center of this local deformation.

Also optionally, the pre-determined path is a line segment for embodying a cursor or linear wheel function.

Also optionally, the pre-determined path is a circle for embodying an annular wheel function.

It is also proposed a method for detecting the actuation of a pre-determined function, this actuation being executed by means of touch contact with a pre-determined path associated with this function on a touch-sensitive surface of an object, comprising:
  transmission in the touch-sensitive surface, by at least two separate sources, of mutually interfering bulk acoustic waves,
  reception, by at least one receiver, of bulk acoustic waves after the propagation and interference thereof in the touch-sensitive surface, and supply of a reception signal on the basis of the acoustic waves received,
  association of a plurality of reference spectral signatures with the pre-determined path, each of these spectral signatures being associated with a localization of a touch on the pre-determined path,
wherein the detection of the actuation of the pre-determined function is performed by comparing at least one spectral signature of the reception signal to a spectral envelope, or reference spectral envelope, of the plurality of reference spectral signatures associated with the pre-determined path.

The invention will be understood more clearly using the following description, given merely by way of example and with reference to the appended drawings wherein.

Figure 1:
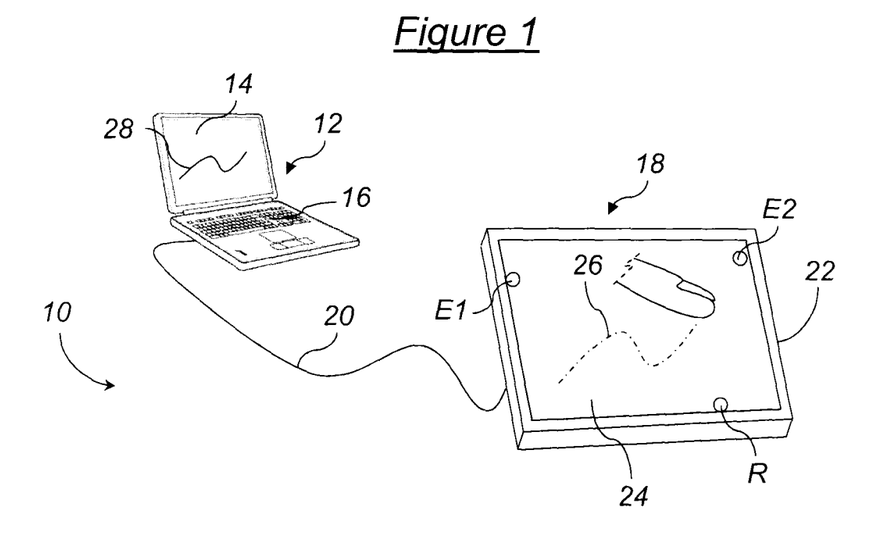
FIG. 1 schematically represents a perspective view of a system for detecting the actuation of a function in the form of a pre-determined path on a touch-sensitive surface of an object, according to a first embodiment of the invention, FIG. 2 schematically represents a front view of a system for detecting the actuation of a function in the form of a pre-determined path on a touch-sensitive surface of an object, according to a second embodiment of the invention, FIG. 3 graphically illustrates an example of a touch signature retrieved by a detection system according to the invention, FIG. 4 schematically represents a touch-sensitive surface functionalized using pre-determined paths defined on this touch-sensitive surface.

The system 10 for detecting the actuation of a function in the form of a predefined path on a touch-sensitive surface of an object, represented in FIG. 1, comprises data processing means, for example a microcomputer 12 particularly comprising a monitor 14 and a keyboard 16, and an object 18 of the interactive tablet type, connected to the microcomputer 12 via a wired or radio link 20.

The interactive tablet 18 comprises a frame 22 and a touch-sensitive surface 24 held by the frame on at least a part of the edges thereof. The touch-sensitive surface 24 is presented for example in the form of a metal, glass or plastic panel, vibrating when elastic mechanical waves, or bulk acoustic waves, are propagated in the thickness thereof. It may be rectangular in shape, particularly in 4/3 format. In concrete terms, it may have a length of 100 mm, a width of 75 mm and a relatively small thickness with respect to the length and width thereof, particularly between 100 μm and 4 mm, for example 450 μm. This thickness is also very small in relation to the characteristic size of a zone of the touch-sensitive surface 24 liable to be touched, a user's finger generally representing a touch approximately one centimeter in diameter.

In the example illustrated in FIG. 1, three piezoelectric transducers E1, E2 and R are mounted against the internal face of the touch-sensitive panel 24, i.e. that which is not accessible to touch and facing the inside of the frame 22. They may particularly be glued to the panel 24, using a conductive epoxy or cyanoacrylate adhesive. They may particularly be embedded in the thickness of the material of the touch-sensitive panel following an injection of polymer resin, the transducers remaining nonetheless very close to the surface, one of the faces thereof (for example the brass face in the case of PZT "buzzer" type transducers) preferably flush with the material surface such that radial expansion of these thin transducers (typically 0.2 mm to 0.5 mm thick) gives rise to bending of the panel or the body and thus effective generation of an anti-symmetric Lamb mode (or more generally of a bending mode in a thin isotropic or anisotropic material). Such bending obtained would be inferior if the transducers were embedded in the vicinity of the half-value thickness of the material.

These piezoelectric transducers are for example LZT type (Lead Zirconate Titanate) ferroelectric ceramic transducers, wherein the ceramic material is bare or laminated on a brass disk. They comprise:
- two separate transmitting transducers E1 and E2 suitable for transmitting elastic mechanical waves (i.e. bulk acoustic waves in the broad sense) in bending modes, such as for example anti-symmetric Lamb waves, such that they are propagated and interfere acoustically in the touch-sensitive panel 24,
- a receiving transducer R suitable for picking up elastic mechanical waves, or bulk acoustic waves, after the propagation thereof in bending modes and the interference thereof in the touch-sensitive panel 24.

These three transducers are preferably arranged outside any axis of symmetry of the touch-sensitive panel 24. Furthermore, they may be small in size and have any geometric shape. In particular, for a touch-sensitive panel 24 with the above-mentioned dimensions (75 mm×100 mm×0.45 mm), they may have a surface area between a few square millimeters and one square centimeter. If the transmitting transducers E1 and E2 are excited by 10 V signals, the reception signal supplied by the receiving transducer R may be up to 0.2 V without amplification.

The transducers E1, E2 and R are connected to an electronic central control unit, for example integrated in the microcomputer 12 and programmed for:
- propagating and interfering in the touch-sensitive panel 24 bulk acoustic waves from the piezoelectric transducers E1 and E2 and having these acoustic waves detected by the piezoelectric transducer R in order to obtain a reception signal, and
- localizing at least one touch on the touch-sensitive panel 24 by comparing some spectral features of the reception signal to a set of reference spectral features, these reference spectral features having been learned during a previous calibration phase of the touch-sensitive panel 24.

The bulk acoustic waves transmitted in the touch-sensitive panel 24 from the piezoelectric transducers E1 and E2 are indeed locally absorbed, blocked or partially reflected when at least one finger or a stylus is in contact with the panel. This gives rise to a disruption of the illumination or radiation information supplied at the reception point R. By retrieving some spectral features, for example spectral amplitude and/or phase parameters, at pre-determined frequencies of the disrupted illumination or radiation information, it is possible to construct a spectral signature of the disruption and compare same to reference spectral signatures retrieved from a library of spectral signatures associated with pre-determined touches and deduce a possible localization of a touch therefrom. The methods used in the above-mentioned documents FR 2 916 545 and FR 2 948 471 are applicable. In particular, the waves transmitted by the transducers E1 and E2 may be embodied by acoustic wavetrains consisting of a plurality of predefined frequencies, for example between 35 kHz and 96 kHz, for the formation of an illumination or radiation figure in a broad spectrum.

This provides, for each touch on the touch-sensitive panel 24, using a finger or a stylus, a localization of this single or multiple touch which may for example by viewed on the monitor of the microcomputer 12. By extension, for a sequence of single or multiple touches detected on the touch-sensitive panel 24, forming a single or multiple trace 26, a localization of this trace 26 may be viewed on the monitor of the microcomputer 12, in the form of a kinematic curve 28 obtained by interpolating the trace 26 detected.

Figure 2:
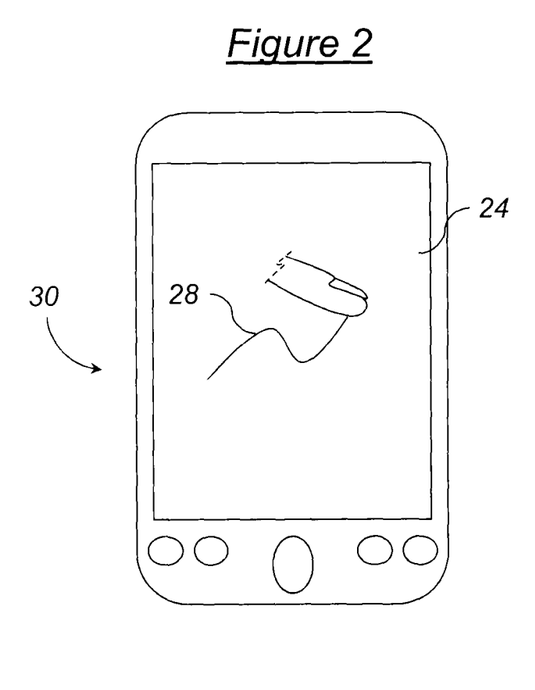

According to a further embodiment of the invention illustrated in FIG. 2, the touch-sensitive panel 24 may be transparent and integrated with the electronic central control unit in an embedded electronic system 30, such as a mobile telephone, a personal digital assistant or any other portable or onboard device such as an onboard touch-sensitive man-machine interface in a motor vehicle. In this case, it may also optionally act as a screen for viewing the kinematic curve 28 obtained by interpolating the trace 26 detected.

Figure 3:
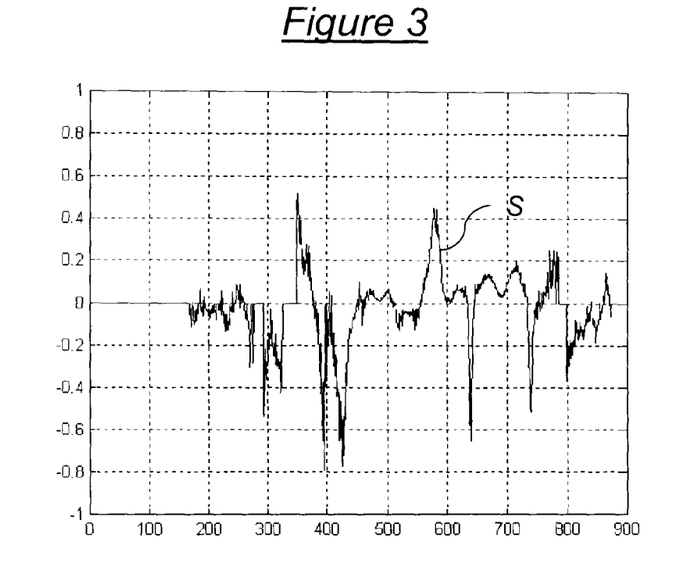

FIG. 3 illustrates by means of a diagram an example of a spectral signature S of a touch defined by the isolated localization thereof on the touch-sensitive panel 24. The general shape of this spectral signature S is significant of the localization of the touch on the touch-sensitive panel 24.

Figure 4:
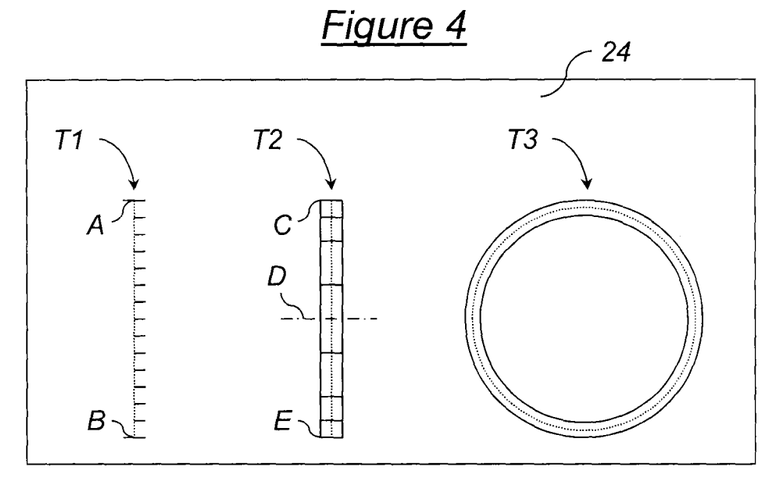

As such, the surface of the touch-sensitive panel 24 may be sampled spatially in a plurality of isolated localizations wherein the reference signatures, which are all different, are learned during a calibration phase. Furthermore, as illustrated in FIG. 4, some pre-determined paths each defined as a set of isolated localizations on the touch-sensitive panel 24 may be associated with pre-determined functions in such a form on the touch-sensitive panel 24.

By way of example, a first pre-determined path T1 is defined and localized on the touch-sensitive panel 24 with a line segment featuring a linear cursor with a plurality of predefined positions or degrees. This path T1 thus locally functionalizes the touch-sensitive panel by forming a cursor therein defined by two ends A and B. It may be considered to consist of a rectilinear set of sampled isolated localizations of the touch-sensitive panel 24, those situated on the segment [A, B] and represented with a fine dotted line.

Also by way of example, a second pre-determined path T2 is defined and localized on the touch-sensitive panel 24 with a line segment featuring a linear wheel virtually rotating about an axis D situated in the plane of the touch-sensitive panel 24. This path T2 thus also locally functionalizes the touch-sensitive panel by forming a wheel therein defined by two ends C and E. It may also be considered to consist of a rectilinear set of sampled isolated localizations of the touch-sensitive panel 24, those situated on the segment [C, E] and represented with a fine dotted line.

Also by way of example, a third pre-determined path T3 is defined and localized on the touch-sensitive panel 24 with a circle featuring an annular wheel virtually rotating about an orthogonal axis with respect the plane of the touch-sensitive panel 24. This path T3 thus also locally functionalizes the touch-sensitive panel by forming an annular wheel therein. It may also be considered to consist of a circular set of sampled isolated localizations of the touch-sensitive panel 24, those situated on the circle represented with a fine dotted line in the annular wheel.

Figure 5:
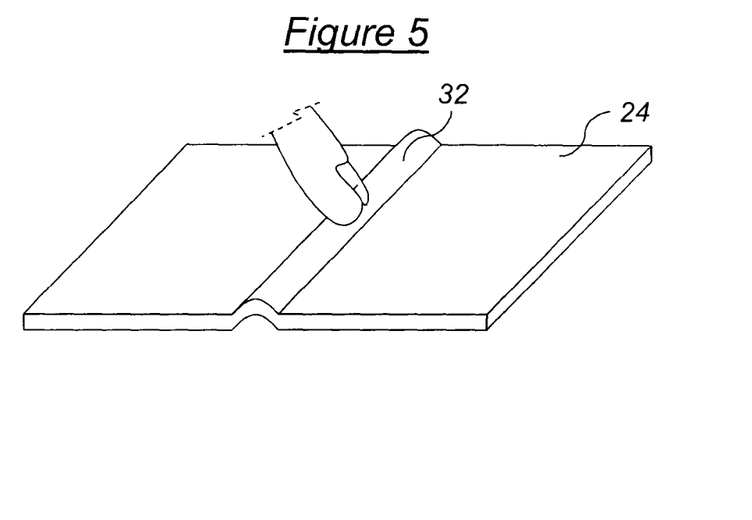
FIG. 5 represents a detailed perspective view of the functionalized touch-sensitive surface in FIG. 4, FIG. 6 graphically illustrates an example of a reference spectral envelope associated with one of the pre-determined paths of the functionalized touch-sensitive surface in FIG. 4.

As illustrated in the perspective view in FIG. 5, each of these paths T1, T2 and T3 may be formed on the touch-sensitive panel 24 with a ridge line formed using a straight or circular tab 32, molded in the material of the touch-sensitive surface 24. In one embodiment that is simple to embody and ergonomic to touch, this tab 32 is formed by a convex local deformation of reduced thickness (in practice, less than 2 mm for a plastic material) of the touch-sensitive panel 24 or of a thickness thinning toward the ridge of the convex surface. It may optionally be more or less leveled, but the lateral span thereof remains less than the width of a finger so as to be able to guide the finger and concentrate the pressure on a small part of the finger pad, with the effect of normalizing the contact surface with the finger, whether such a finger is large (that of an adult) or small (that of a child), enhancing the reproducibility of the reference spectral signatures and thus facilitating touch recognition. Alternatively, the local deformation could be concave. Furthermore, outside the functionalized zones, the touch-sensitive panel 24 may advantageously be much thicker which will reduce the relative disruption of the reception spectrum accordingly so as to enable for example the palm of a hand to press on a non-functionalized zone of the surface without triggering an attempt at localization by the system, the system considering the disruption detected to be merely a parasitic signal requiring a redefinition of the off-load measurement signal (i.e. without contact. This may be described as "calibration" by analogy with a measurement of the weight of a vessel before filling same).

Alternatively or additionally, the paths T1, T2 and T3 may be represented graphically using an underlying graphic screen.

Figure 6:
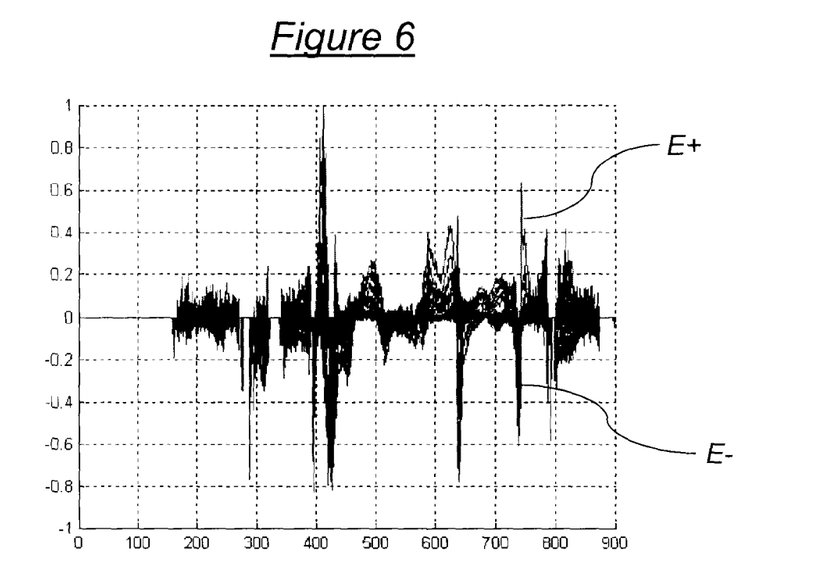

By overlaying the reference spectral signatures of all the points forming any one of the paths T1, T2 or T3 in FIG. 4, a diagram such as that in FIG. 6 is obtained, wherein a slight homogeneous variation of the spectral signatures with respect to each other may be observed. By only retaining the upper and lower values of all these spectral signatures, the spectral envelope E thereof is defined, which may then, per se, be considered to consist of two spectral signatures: one annotated E+ and described as the upper part of the envelope, containing all the upper values mentioned above, the other annotated E− and described as the lower part of the envelope, containing all the lower values mentioned above. This spectral envelope represents a reference for the path T1, T2 or T3 in question. It characterizes same uniquely.

In mathematical terms, if F is used to annotate the spectral band of interest wherein all the reference spectral signatures are defined, the expression of the reference spectral envelope adopts the following form:

$$\forall f \in F, \begin{cases} E+(f) = \underset{i}{\mathrm{Max}} S_i(f) \\ E-(f) = \underset{i}{\mathrm{Min}} S_i(f) \end{cases},$$

where $S_i$ denotes the reference spectral signatures associated with the path in question.

Alternatively, the spectral envelope may also only be computed for some frequencies of the spectral band F, for example by excluding the spectral components with insufficient amplitudes (for example less than 1% of the maximum peak), the variability thereof possibly being deemed too unstable with respect to further disruptions such as variations in respect of temperature or mounting of the touch-sensitive panel 24 in the object.

Figure 7:
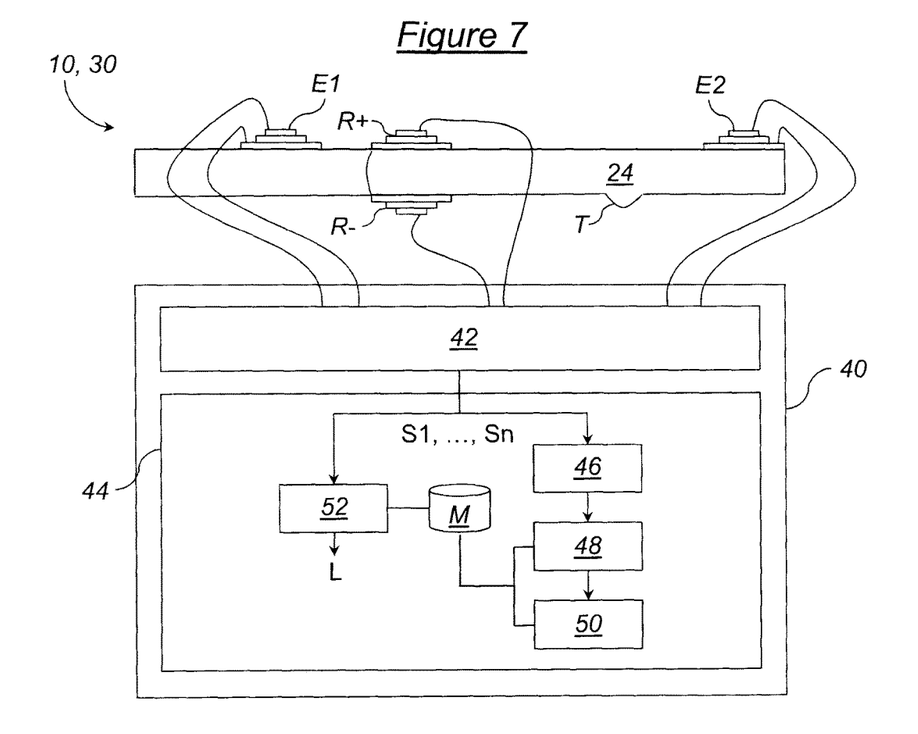
FIG. 7 illustrates a side view of the touch-sensitive surface in FIG. 4, connected to an electronic controlling central unit of the system in FIG. 1 or 2.

The touch-sensitive panel 24 is represented in a side view in FIG. 7. It is connected to an electronic central control unit 40 comprising:
 a bulk acoustic volume transmission/reception microcontroller 42, more specifically electrically connected to the piezoelectric transducers E1, E2 and R, and
 a processing module 44 programmed for digitally processing the reception signals supplied by the transmission/reception microcontroller 42 so as to detect and localize single or multiple touches on the touch-sensitive panel 24 and detect the actuation of a function in the form of a pre-determined path T on the contact surface of the touch-sensitive panel 24.

The transmission/reception microcontroller 42 is provided with an arithmetic and logical unit, optionally controlled by the microcontroller 12 in the case of the device 10. It comprises a digital output connected to a full-bridge power stage connected to the transmitting transducers E1 and E2, or first involving one pulse width modulation stage (PWM, or Pulse Width Modulation) followed by low-pass filtering before amplification and excitation of the transducers E1 and E2. Finally, the microcontroller may also transmit an output signal in the form of an amplitude encoded in 8 or 16 bits, connected via a digital/analog converter wherein the output is optionally amplified and connected to the transmitting transducers E1 and E2. Furthermore, the receiving transducer R is connected to an analog/digital converter in turn connected to or an integral part of the transmitting/receiving microcontroller 42. This analog/digital converter and the transmitting/receiving microcontroller 42 are suitable for sampling the signals detected over at least 8 bits, preferentially over 10 bits, or over 12 or 16 bits or more at a rate of at least 192 kHz and preferentially 350 kHz.

According to one alternative embodiment, or more particularly in the case of a test bench, the analog/digital and digital/analog converters may be replaced by an acquisition board and an arbitrary function generator.

The electrical connections to the transducers E1, E2 and R may consist particularly of audio type coaxial cables or any other shielded connection. This condition is stronger for the receiving transducer R wherein small disruptions are considered than for the two transmitting transducers E1 and E2 which may be wired via twisted pairs.

In the example illustrated in FIG. 7, it should further be noted that the receiving transducer R actually consists of two transducers R+ and R− arranged facing each other on either side of the touch-sensitive panel 24. This arrangement in receiving mode is not essential but is advantageously used to enable selective reception of the bulk acoustic waves after the propagation thereof and interference in the touch-sensitive panel 24. In particularly, it is aimed at retrieving a reception signal R(t) only essentially dependent on the fundamental anti-symmetric Lamb wave propagation mode A0. As a general rule, as the frequencies used in transmission do not exceed 100 kHz, bulk acoustic waves are propagated in a thin panel in the form of Lamb waves in three modes: symmetric mode (S), anti-symmetric mode (A)

and transverse horizontal mode (TH), each of these modes being characterized by a particular deformation of the thin panel or body and a specific dispersion curve. Given that it is essentially the fundamental anti-symmetric mode A0 (or bending mode for non-homogeneous non-isotropic solids) that reacts to a single or multiple touch on the touch-sensitive panel 24, it is advantageous to filter (i.e. reject or discriminate) the other modes to prevent unnecessary distortions.

The selective reception of the fundamental anti-symmetric Lamb wave propagation mode A0 using two transducers R+et R− arranged opposite each other may be envisaged in concrete terms in different ways:
- the two transducers R+ and R− are arranged so as to have asymmetrically oriented polarizations relative to the median plane of the touch-sensitive panel 24 and are electrically connected together in parallel,
- the two transducers R+ and R− are arranged so as to have symmetrically oriented polarizations relative to the median plane of the touch-sensitive panel 24 and are electrically connected together in antiparallel,
- the two transducers R+ and R− are arranged so as to have symmetrically oriented polarizations relative to the median plane of the touch-sensitive panel 24 and are electrically connected together in series (arrangement illustrated in FIG. 7, requiring less connection cables than the first two and easy to embody when the LZT transducers can be connected via the brass disks thereof).

These three types of arrangement are only effective if the touch-sensitive panel has a relatively homogeneous and isotropic thickness.

Alternatively or additionally to the selective reception of the fundamental anti-symmetric Lamb wave propagation mode A0 using the two transducers R+et R-arranged facing each other, it is also possible to envisage selective transmission of this fundamental anti-symmetric mode using pairs of transmitting transducers (E1+ and E1−, E2+ and E2−) arranged facing each other. However, in practice, this alternative or this addition is not very advantageous since it gives rise to a significant increase in the static capacitance of the transmitting transducers and thus in the electrical power consumption.

The reception signal R(t), measured at a rate of twenty acquisitions per second, is digitized by the transmission/reception microcontroller 42. When the touch-sensitive panel 24 is touched for a certain time, n successive digital signals R1, . . . , Rn are thus acquired. These signals may be transformed by means of FFT (Fast Fourier Transform), compared to a reference off-load spectrum and transformed into spectral signatures S1, . . . , Sn according to the teaching of the patent documents FR 2 916 545 and FR 2 948 471 before being sent to the processing module 44. These successive spectral signatures S1, . . . , Sn are received and processed by the module 44.

The processing module 44 comprises a module 46 for computing a spectral envelope (E+, E−) of the spectral signatures S1, . . . , Sn. This computation is for example the same as that described above for the reference envelope associated with a pre-determined path.

The processing module 44 further comprises a module 48 for characterizing the contact R1, . . . , Rn by comparing the spectral envelope (E+, E−) computed by the module 46 to a reference spectral envelope (Eref+, Eref−) associated with the path T, stored in a memory area M to which the characterization module 48 has read access.

This comparison is a similarity test between the computed spectral envelope (E+, E−) and the reference spectral envelope (Eref+, Eref−). It may adopt a plurality of forms. One of these may consist of computing a cost function representative of what exceeds the common area for both envelopes, for example according to the following formulation:

$$Cr = \sum_{f \in F} sat(E^+ - Eref^+) + \sum_{f \in F} sat(E^- - Eref^-) +$$
$$\sum_{f \in F} sat(Eref^+ - E^+) + \sum_{f \in F} sat(Eref^- - E^-)$$
$$\text{where: } \begin{cases} sat(x) = 0 & \text{if } x < 0 \\ sat(x) = x & \text{else} \end{cases}.$$

As such, the detected contact R1, . . . , Rn may be considered as an actuation of the function associated with the path T if the cost function remains below a certain threshold to be defined.

It should be noted that when the touch-sensitive panel 24 comprises a plurality of different functions in the form of a plurality of pre-determined paths as in the example in FIG. 4, it is possible to compute a confidence index IC associated with each function for the similar test performed on the computed spectral envelope (E+, E−), for example expressed as a percentage (which may be positive or negative) according to the following formula:

$$IC(j) = 100 \cdot \left(1 - \frac{Cr(j)}{\langle Cr \rangle}\right),$$

where Cr(j) is the cost function computed between the spectral envelope (E+, E−) and the reference spectral envelope associated with the function j and where <Cr> is the mean value of the cost functions computed between the spectral envelope (E+,E−) and the reference spectral envelopes of all the functions. The function providing the best index IC and exceeding a recognition threshold to be determined according to the application is then selected.

The processing module 44 further comprises a module 50 for interpreting the contact R1, . . . , Rn when it has been characterized as being an actuation of the function associated with the path T. This interpretation particularly includes for example an estimation of a direction, an amplitude and a speed of movement of the touch contact. This may be performed by means of simple computations, accounting for the order of appearance of the spectral signatures S1, . . . , Sn and the times at which they appear. By way of example, by focusing on a particular frequency of interest of these successive spectral signatures, it is possible to compile a new temporal signature characteristic of a movement to be compared in a manner known per se to a base of reference temporal characteristics saved in the memory area M. These reference characteristics may be associated with positioning or scrolling operations in menus defined by the cursor or wheel function formed on the touch-sensitive panel 24, enabling accurate interpretation of the touch contact detected: choice of an item in a list of items (linear cursor or wheel function), more or less rapid scanning of items in a list (linear or annular wheel function), etc.

Finally, in parallel with the modules 46, 48 and 50 mentioned above, the processing module 44 comprises a module 52 for localizing L each touch on the touch-sensitive panel 24 by comparing each signature S1, . . . , Sn to a set of reference signatures stored in the memory area M. The functioning of this module is known in the light of the patent documents FR 2 916 545 and FR 2 948 471, it will thus not be described in detail. Of the reference signatures, those which are on the path T are precisely those used for computing the reference spectral envelope associated with the path T. Both detections, one dynamic performed by comparing the spectral envelope of the sequence of signatures S1, . . . , Sn to a reference spectral envelope, the other static performed by comparing each signature S1, . . . , Sn to a set of reference signatures covering the surface of the touch-sensitive panel 24, are complementary and combined advantageously. By the way, the results (successive localizations) of the static detection may be processed by the interpretation module 50, alternatively or additionally to that previously described, to estimate the direction, amplitude and speed of the motion detected.

Figure 8:
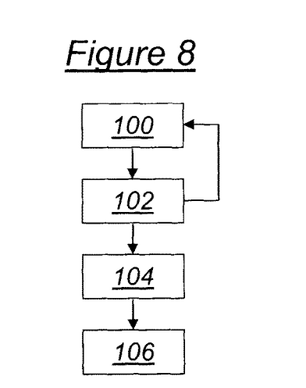
FIG. 8 illustrates the successive steps of a method for detecting the actuation of a function in the form of a pre-determined path on a touch-sensitive surface of an object, according to an embodiment of the invention.

A method for detecting the actuation of a pre-determined function, this actuation being executed by means of touch contact with a pre-determined path associated with this function on a touch-sensitive surface of an object, implemented by the system 10 or 30 described above will now be described in detail with reference to FIG. 8.

During a step 100, bulk acoustic waves are transmitted in the touch-sensitive panel 24 by the transmitting transducers E1 and E2 on the command of the transmission/reception microcontroller 42.

During a step 102, the acoustic waves transmitted are received by the receiving transducer R after being propagated in the touch-sensitive panel 24 and having interfered with each other. The transmission/reception microcontroller 42 processes the analog signal provided by the transducer R to supply a digitized reception signal, transformed by FFT, and transformed by computation into a spectral signature.

The steps 100 and 102 are repeated in loops.

During a step 104 performed following one of the instances of the repeated step 102, a touch contact with the touch-sensitive panel 24 is detected. This detection may result from a sudden variation of certain characteristics of the reception signal or the spectrum thereof (attenuation, distortion of the spectrum relative to an off-load reference spectrum, etc.). The contact is detected for a time suitable for the acquisition of a sequence of spectral signatures S1, . . . , Sn and the computation, by the module 46, of the spectral envelope thereof.

Finally, during a detection step 106 performed by the modules 48 and 50, the computed spectral envelope is compared to the reference spectral envelope associated with the path T in question (T1, T2 or T3) to determine whether the touch contact detected indeed relates to an actuation of the function in the form of the path T, and then analyzed as required to interpret the nature of the contact in more detail (direction, amplitude and speed of movement detected).

It is obvious that a system for detecting the actuation of a function in the form of a pre-determined path on a touch-sensitive surface of an object such as that described above represents an enhancement of the technology disclosed in the patent documents FR 2 916 545 and FR 2 948 471 to a dynamic detection application, one major effect whereof is a very substantial gain in terms of memory and computing time. By comparing the acquired and learned spectral signature envelopes, the complexity of the computations is further quasi-independent of the rate at which the system is capable of performing the acquisitions thereof. Furthermore, it is observed that detection reliability is also enhanced, the spectral envelopes proving to be very discriminatory from one path to another on the touch-sensitive panel 24. Detection remains reliable even when the movement of the touch contact is rapid, demonstrating the robustness of the principle used by the invention.

It should further be noted that the invention is not limited to the embodiments described above.

In particular, the touch-sensitive panel 24 illustrated and described in detail with reference to the examples in FIGS. 1 and 2 may be replaced by any touch-sensitive body of any shape, including three-dimensional.

It will more generally be clear to those skilled in the art that various modifications may be made to the embodiments described above, in the light of the teaching described herein. In the claims hereinafter, the terms used should not be interpreted as limiting the claims to the embodiments disclosed in the present description, but should be interpreted to include therein any equivalents intended to be covered by the claims due to the wording thereof and which can be envisaged by those skilled in the art by applying general knowledge to the implementation of the teaching disclosed herein.

The invention claimed is:

1. A system for detecting actuation of a pre-determined function, the actuation being executed by touch contact with a single pre-determined path associated with the function on a touch-sensitive surface of an object, comprising:
   at least two separate sources for transmitting bulk acoustic waves in the touch-sensitive surface, configured to generate acoustic interference between the transmitted waves,
   at least one bulk acoustic wave receiver after propagation and interference thereof in the touch-sensitive surface, configured to supply a reception signal on the basis of the acoustic waves received;
   a memory that stores a plurality of reference spectral signatures associated with the single pre-determined path, each of the reference spectral signatures being associated with a localization of a touch that is part of a trace made on the pre-determined path, and
   processing circuitry configured to detect, actuation of the pre-determined function by comparing at least one spectral signature of the reception signal to a spectral envelope, or reference spectral envelope, of the plurality of reference spectral signatures associated with the pre-determined path, the spectral envelope corresponding to first and second spectral signatures, the first spectral signature being an upper part of the envelope and the second spectral signature being a lower part thereof;
   wherein each spectral signature, reference signal, and reception signal, is defined on the basis of a spectrum, of the corresponding reference signal and reception signal, computed in a pre-determined frequency band, the reference spectral envelope being computed in the same pre-determined frequency; and
   wherein the reference spectral envelope is computed only at frequencies of the pre-determined frequency band for which amplitudes of the spectral signatures associated with the pre-determined path are greater than a minimum threshold, or a threshold set at 1% of a maximum peak of these signatures.

2. A system for detecting actuation of a function according to claim 1, wherein the processing circuitry is further configured to:
   compute a spectral envelope of a plurality of successive spectral signatures of the reception signal;
   compare the computed spectral envelope to the reference spectral envelope.

3. A system for detecting the actuation of a function according to claim 2, wherein the processing circuitry is configured to perform a similarity test between the computed spectral envelope and the reference spectral envelope based on the following computation:

$$Cr = \begin{cases} \sum_{f \in F} sat(E^+ - Eref^+) + \sum_{f \in F} sat(E^- - Eref^-) + \\ \sum_{f \in F} sat(Eref^+ - E^+) + \sum_{f \in F} sat(Eref^- - E^-) \end{cases},$$

in which F denotes the band of frequencies f wherein the envelopes are defined, $E^+$ and $E^-$ the upper and lower parts of the computed spectral envelope, $Eref^+$ and $Eref^-$ the upper and lower parts of the reference spectral envelope, and sat( ) the function defined as follows:

$$\begin{cases} sat(x) = 0 \text{ if } x < 0 \\ sat(x) = x \text{ else} \end{cases}.$$

4. A system for detecting the actuation of a function according to claim 1, wherein the pre-determined path is in a form on the touch-sensitive surface of a ridge line formed using a tab molded in a material of the touch-sensitive surface.

5. A system for detecting the actuation of a function according to claim 4, wherein the tab is formed by a local deformation of reduced thickness of the touch-sensitive surface or of a thickness thinning toward the center of the local deformation.

6. A system for detecting the actuation of a function according to claim 1, wherein the single pre-determined path associated with the plurality of reference spectral signatures is a line segment for embodying a cursor or linear wheel function.

7. A system for detecting the actuation of a function according to claim 1, wherein the single pre-determined path associated with the plurality of reference spectral signatures is a circle for embodying an annular wheel function.

8. A method for detecting the actuation of a predetermined function, the actuation being executed by touch contact with a single predetermined path associated with the predetermined function on a touch-sensitive surface of an object, comprising:
  transmission in the touch-sensitive surface, by at least two separate sources, of mutually interfering bulk acoustic waves;
  reception, by at least one receiver, of bulk acoustic waves after propagation and interference thereof in the touch-sensitive surface, and supply of a reception signal on the basis of the acoustic waves received;
  association of a plurality of reference spectral signatures with the single predetermined path, each of the reference spectral signatures being associated with a localization of a touch that is part of a trace made on the pre-determined path;
  detection of the actuation of the pre-determined function by comparing at least one spectral signature of the reception signal to a spectral envelope, or reference spectral envelope, of the plurality of reference spectral signatures associated with the pre-determined path, the spectral envelope corresponding to first and second spectral signatures, the first being an upper part of the envelope and the second a lower part thereof;
  wherein each spectral signature, reference signal, and reception signal, is defined on the basis of a spectrum, of the corresponding reference signal and reception signal, computed in a pre-determined frequency band, the reference spectral envelope being computed in the same pre-determined frequency; and
  wherein the reference spectral envelope is computed only at frequencies of the pre-determined frequency band for which amplitudes of the spectral signatures associated with the pre-determined path are greater than a minimum threshold, or a threshold set at 1% of a maximum peak of these signatures.

* * * * *

UNITED STATES PATENT AND TRADEMARK OFFICE
CERTIFICATE OF CORRECTION

PATENT NO. : 10,048,810 B2
APPLICATION NO. : 14/428549
DATED : August 14, 2018
INVENTOR(S) : Gerard Chalubert et al.

It is certified that error appears in the above-identified patent and that said Letters Patent is hereby corrected as shown below:

In the Claims

Column 12, Line 54, please add --band-- in the following phrase "same pre-determined frequency band; and"

Column 14, Line 33, please add --band-- in the following phrase "same pre-determined frequency band; and"

Signed and Sealed this
Eleventh Day of June, 2019

Andrei Iancu
*Director of the United States Patent and Trademark Office*